_United States Patent Office_

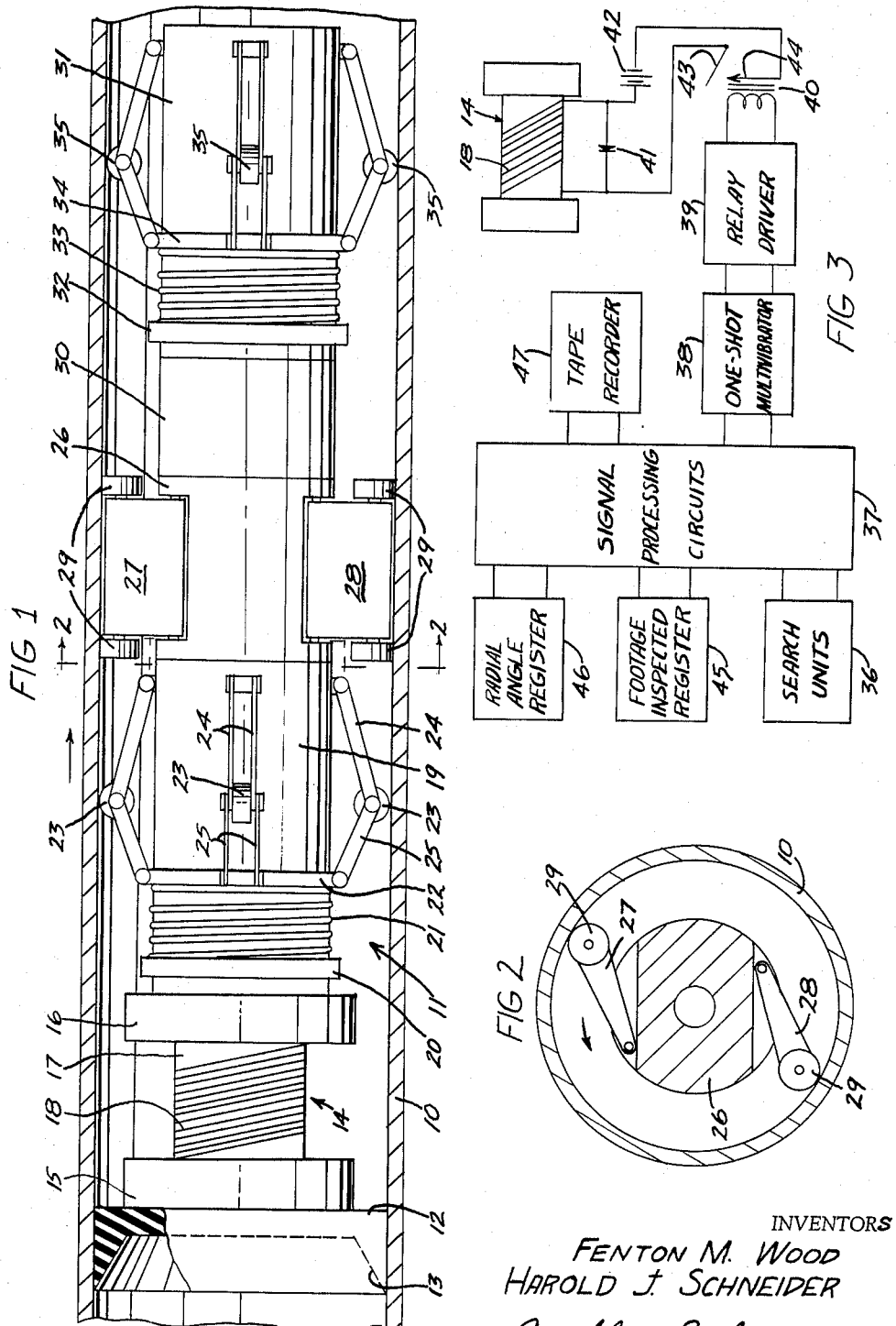

3,238,448
Patented Mar. 1, 1966

3,238,448
PIPELINE FLAW DETECTOR AND MARKER
Fenton M. Wood and Harold J. Schneider, Houston, Tex., assignors, by mesne assignments, to American Machine & Foundry Company, New York, N.Y., a corporation of New Jersey
Filed June 6, 1961, Ser. No. 115,243
11 Claims. (Cl. 324—37)

This invention relates to the inspection of ferromagnetic goods and, more particularly, to a method and apparatus for detecting flaws in a pipeline and marking the location of such flaws so that a repair crew can accurately locate those portions of the pipeline containing the flaws.

While a relatively short tube or pipe can be inspected successfully with relative ease by means of several types of devices currently available, more severe problems arise when the work to be inspected is a pipeline which is several miles long and which may be buried in the ground. In inspecting a long pipeline, the inspection apparatus is normally inserted as a unit for bodily movement through the pipeline. Once within the pipeline, the inspection apparatus must function automatically to inspect the entire length of the pipeline to accurately locate any flaws which might exist in the pipeline so that the necessary repair can be made to prevent failure of the pipeline due to such flaws.

Accordingly, one of the objects of this invention is to provide an improved method and apparatus for inspecting elongated ferromagnetic goods to locate any flaws within such goods.

Another object is to provide an improved method and apparatus for detecting flaws in a pipeline and marking the location of such flaws.

Still another object is to provide an improved inspection method and apparatus for magnetically marking the locations of flaws, if any, within a tubular ferromagnetic object.

Yet another object is to provide inspecion apparatus for inspecting an elongated pipeline to determine and mark the location of any flaws within the pipeline, which apparatus is dependable and requires relatively low amounts of power for operation.

In order that the manner in which these and other objects are attained in accordance with the invention can be understood in detail, reference is had to the accompanying drawing, which forms a part of this specification, and wherein:

FIG. 1 is an elevational view, partly in section, illustrating one embodiment for carrying out the method of the invention;

FIG. 2 is a transverse sectional view taken generally along line 2—2 of FIG. 1; and FIG. 3 is a block diagram illustrating some of the electrical components of the embodiment shown in FIG. 1.

In accordance with the method of the invention, the location of a flaw in an elongated ferromagnetic member such as a pipe line of ferromagnetic material is marked by simultaneously passing through the pipeline both a flaw detecting device and an electromagnet. Any flaws which exist in the pipeline are detected by the flaw detecting device. When a flaw is detected, the electromagnet is actuated to characteristically magnetize the pipeline to provide an indication of the location of the detected flaw.

One advantageous embodiment for carrying out the invention is illustrated in the drawing. Referring to FIGS. 1 and 2, there is shown a portion of a pipeline 10 of the type used by the oil industry to convey fluids over relatively long distances, the pipeline being of ferromagnetic material such as steel. Pipeline inspection apparatus 11 is disposed in pipeline 10 for movement therethrough over the length being inspected, such apparatus being inserted into the pipeline in any usual fashion.

Means are provided for passing the inspection apparatus through the pipeline, such means including a conventional gas seal 12 in the form of a cup-shaped plug of resilient material having a rearwardly extending lip 13. Fluid pressure is applied against the left end of the seal as viewed in FIG. 1, so that the lip engages the adjacent portion of the inner wall of pipeline 10 and thereby creates a pressure differential which, acting upon the gas seal, propels the apparatus through the pipeline to the right and in the direction of the arrow as viewed in FIG. 1. It is obvious that the fluid pressure within the pipe to the right of seal 12 must be lower than that to the left of the seal in order to effect the necessary movement.

The leading end of gas seal 12 is connected to the trailing end of an electromagnet 14 having a pair of cylindrical poles 15 and 16 interconnected by a cylindrical core 17 upon which an energizing coil 18 is wound. Poles 15 and 16 and core 17 are supported coaxially with pipeline 10, the diameters of poles 15 and 16 being less than that of the internal diameter of the pipeline. The diameter of core 17 is less than that of poles 15 and 16. The electromagnet is operative, upon energization of coil 18, to create a magnetic field which passes through the walls of pipe 10, the field being of sufficient strength to permanently magnetize such portions of the pipeline and thereby establish a magnetic field of a given polarity which extends for a distance of several yards around the pipeline so that the field can be detected by a magnetometer. Where the pipeline is buried several feet underground, it is obvious that the strength of the field induced in the pipeline must be sufficient to extend above the surface of the ground and thereby enable the magnetometer to indicate the presence of such field.

The leading end of electromagnet 14 is connected to the trailing end of a cylindrical housing 19 which encloses the power supply used to operate components of the apparatus. The power supply can be in the form of batteries or a turbo-generator actuated by the fluid pressure used to propel the apparatus through the pipeline. An annular flange 20 is secured to the outer surface of housing 19 and bears against a helical compression spring 21 which, in turn, bears against a ring 22 connected to bias a plurality of centralizing wheels 23 into contact with the inner wall of pipeline 10 so that the apparatus moves through the pipeline generally along the axis thereof. Each of wheels 23 is supported by a pair of arms 24 fixedly secured at one end to housing 19 and by a pair of arms 25 pivotally connected to ring 22. Ring 22 is slidable along housing 19 so that wheels 23 are maintained in engagement with the wall of pipe 10 at all times.

The leading end of housing 19 is connected to a rotary support 26 upon which are pivotally mounted a pair of detector shoes 27 and 28, support 26 being rotatable relative to housing 19 so that the detector shoes scan the entire inner surface of the pipeline in a helical pattern as the inspection apparatus is propelled through the pipeline. A pair of rubber wheels 29 are connected to each of the detector shoes for spacing these shoes a relatively short distance from the inner wall of the pipe so that they do not frictionally engage the wall.

The leading end of support 26 is connected to a housing 30 which encloses the motive means for rotating support 26 and detector shoes 27 and 28. The leading end of housing 30 is connected to the trailing end of a housing 31 upon which are mounted a flange 32, a spring 33, and a ring 34 which support a plurality of centralizing wheels 35 in a manner similar to that by which wheels 23 are supported. Housing 31 encloses the instruments of the apparatus.

The inspection apparatus includes means for detecting flaws in the pipeline. Such means can be any one of several well-known devices such as the type including a plurality of search units 36 which produce an electrical output signal indicative of the presence and characteristics of a flaw. The search units can be in the form of search coils embedded in detector shoes 27 and 28. The output of search units 36 is fed into signal processing circuits 37. It is to be understood that, while a pipeline can contain many flaws, only certain ones may be of such a serious nature as to require repairing the pipeline. Thus, while search units 36 detect the presence of all flaws, the signal processing circuits can be arranged to determine whether or not each detected flaw is a serious flaw. If it is, then the signal processing circuits 37 produce an output pulse which is fed to a one-shot multi-vibrator 38 connected to actuate a relay driver 39 which in turn actuates a relay 40.

Coil 18 is connected in parallel with a surge limiter 41 and a source of power such as a battery 42 of sufficient voltage to cause sufficient current to flow through coil 18 so that the magnetic field of the magnetized portion of the pipeline can be readily detected by a magnetometer. Relay 40 includes a movable contact 43 which cooperates with a stationary contact 44 connected so that the output of the battery is fed to coil 18 only when the movable contact engages the stationary contact. When the multivibrator actuates the relay driver, movable contact 43 momentarily engages stationary contact 44 to allow current to flow from battery 42 to coil 18 for only a short period of time to prevent the magnetized portion of the pipe from being relatively long due to the movement of the electromagnet as it permanently magnetizes the pipe.

Because, in the embodiment illustrated in the drawings, the electromagnet is axially spaced from the detector unit, the relay driver or one of the other components can include a time delay connected to delay energization of the electromagnet until the electromagnet is positioned immediately adjacent to the portion of the pipeline containing the detected flaw.

A footage-inspected register 45 and a radial angle register 46 are connected to the signal processing circuits 37 and are operative to provide an indication of the point along the pipeline at which the flaw is located and the angular position of such flaw, respectively, so that a repair crew can more readily locate that portion of the pipeline containing the flaw. A tape recorder 47 is actuated by the signal processing circuits to provide a magnetic record of the inspection.

As previously indicated, the apparatus shown in the drawing is only one means for carrying out the method of the invention. There are several other means for carrying out the method. For example, where a short section of pipe is being inspected, it may be more practical to connect the inspection apparatus to a cable which can be manually or otherwise actuated to pull the inspection apparatus through the member being inspected. The search units and signal processing circuits can be connected to actuate a meter so that, when the flaw is encountered, the operator can then manually close a switch to actuate the electromagnet to magnetize that portion of the member containing the flaw.

Further, in the embodiment illustrated, the pipeline is characteristically magnetized to produce a magnetic field of a given polarity at the location of each flaw. Other types of characteristic magnetization can be employed. For example, the electromagnet can be continuously energized as it passes through the pipeline. When a flaw is encountered, the direction of current flowing through coil 18 is reversed so that the plurality of the magnetic field is also reversed. Under such circumstances, a flaw would be indicated on a magnetometer by movement of the needle to indicate a reversal of the field. This method is advantageous in that small residual fields in pipeline 10 are erased and thereby precludes noise on the search magnetometer. However, this method is disadvantageous because it requires a continuous application of power to the electromagnet.

It will be apparent to those skilled in the art that many changes can be made without departing from the scope of invention as defined in the appended claims.

What is claimed is:

1. In apparatus for inspecting ferromagnetic tubular goods, said apparatus being adapted to be propelled through the interior of said goods, the combination of magnetic means operative to characteristically magnetize portions of said tubular goods, at least one detector shoe mounted to scan the inner wall of said goods to detect flaws in those portions being scanned, and means connected to said detector shoe and to said magnetic means to operate said magnetic means to characteristically magnetize those portions of said goods which contain flaws.

2. Pipeline inspection apparatus comprising a housing means arranged to freely move with a motive fluid through a pipeline, means supported by said housing means for detecting flaws in said pipeline, and means supported by said housing means for characteristically magnetizing those sections of said pipeline which contain flaws.

3. Pipeline inspection apparatus comprising a housing means arranged to freely move with a motive fluid through a pipeline, said housing means supporting an electromagnet, a source of direct current electrical power, and a circuit means, said circuit means being connected to said electromagnet and to said source and operative to energize said electromagnet to magnetize those portions of said pipeline adjacent to said electromagnet as said housing moves through said pipeline, and detecting means supported by said housing and operably connected to said circuit means for actuating the same to cause said pipeline to be characteristically magnetized at the location of each flaw.

4. Pipeline inspection apparatus comprising fluid operated motive means for driving said apparatus through said pipeline, means for maintaining said apparatus substantially along the axis of said pipeline, magnetic means operative to magnetize portions of said pipeline, said magnetic means including a core having a coil thereon and having circular pole pieces disposed at each end of the core to be transverse to the pipeline length in spaced apart relation and approaching the internal surface of the pipeline, detecting means operative to detect flaws in said pipeline, and means connected to said detecting means and said magnetic means for operating said magnetic means to characteristically magnetize those portions of said pipeline which contain flaws.

5. A method for marking the location of flaws in a fluid carrying tubular ferromagnetic member, comprising simultaneously introducing a flaw detecting device and an electromagnet into said fluid for movement through said member, detecting the existence of a flaw by said flaw detecting device, and in response to detection of said flaw, actuating said electromagnet with direct current to characteristically magnetize said member to magnetically mark the location of said detected flaw.

6. A method for marking the location of a flaw in a ferromagnetic pipeline, comprising simultaneously passing through said pipeline both a flaw detecting device and an electromagnet, detecting the existence of flaws by said flaw detecting device and, in response to detection of each flaw, energizing said electromagnet with direct current to characteristically magnetize said pipeline and thereby magnetically mark the location of each detected flaw.

7. A method for inspecting a tubular ferromagnetic member to locate flaws and mark the position of the flaws, comprising the steps of;

passing a flaw inspection device within said member;

magnetically marking on the inside of said member the location of a flaw upon detection by said inspection device to enable magnetic sensing of said magnetic mark from outside said member.

8. A method for inspecting a line of ferromagnetic pipe for flaws, comprising the steps of;
   locating a flaw by inspecting the inside of said pipeline, and
      magnetizing the pipe wall from within said pipeline at the location of flaw to a sufficient extent that the magnetic mark can be detected from outside said pipe.

9. A method for inspecting a line of ferromagnetic pipe, comprising the steps of;
   locating a flaw by internal inspection of the pipe with a flaw inspection device that travels through the pipe;
   marking the location of the flaw by magnetizing a portion of the pipe adjacent the flaw with a magnetizing means carried by said flaw inspection device,
      said magnetic mark being sufficient for detection outside said pipe; and,
   magnetically scanning the outside of said pipe to detect said magnetic mark and thereby locate said defective pipe portion.

10. A method for inspecting a line of ferromagnetic pipe disposed below the ground surface and extending substantially horizontal, comprising the steps of;
    locating a flaw by internal inspection of the pipeline with a flaw inspection device that travels through the pipeline;
    marking the location of the flaw by magnetizing a portion of the pipe adjacent the flaw with a magnetizing means carried by said flaw inspection device,
       said magnetic mark being sufficient for detection at the ground surface;
    magnetically scanning the ground surface above said pipeline to detect the magnetic mark and thereby locate said defective pipe portion.

11. Apparatus for inspecting a pipeline of ferromagnetic sections, comprising;
    a housing means dimensioned to fit within and move along the pipeline;
    centering means on said housing means for maintaining alignment of the housing axis substantially parallel to the pipeline axis;
    fluid responsive means carried by said housing for propelling said housing means along the pipeline;
    instrumentation means mounted on said housing means and comprising;
       a flaw detection means having at least one search shoe;
    said housing means having a support extending longitudinal of the pipeline and being rotatably driven about said housing axis;
    a member pivotally attached to said support and extending outward towards the pipe inner surface, substantially transverse to the axis of said housing means, said search shoe being attached at the outward end of said member to move toward the internal pipe surface under the action of centrifugal force as said support rotates;
    means for spacing said search shoe slightly from the pipe internal surface;
    said housing means having a magnetic field producing means including a core with circular pole pieces disposed transverse to the pipe length in spaced apart relation and approaching the internal surface of the pipe, and a coil on said core;
    said instrumentation means further comprising a D.C. source for energizing said coil, and
       control circuit means for momentarily connecting said D.C. source to said coil upon detection of a flaw to magnetize the pipe adjacent the detected flaw.

References Cited by the Examiner
UNITED STATES PATENTS

| | | | |
|---|---|---|---|
| 2,246,542 | 6/1941 | Smith | 324—34 X |
| 2,282,929 | 5/1942 | Billstein | 324—37 X |
| 2,937,368 | 5/1960 | Newby | 324—34 |
| 2,940,302 | 6/1960 | Scherbatskoy | 324—37 X |

RICHARD B. WILKINSON, *Primary Examiner.*

FREDERICK M. STRADER, *Examiner.*

R. B. LAPIN, *Assistant Examiner.*